US011737498B2

(12) United States Patent
 Liu

(10) Patent No.: US 11,737,498 B2
(45) Date of Patent: Aug. 29, 2023

(54) RECHARGEABLE BATTERY COMPRISING A COPPER THREADED RING WITH A CROSS-SHAPED INDENTATION

(71) Applicant: Tuanfang Liu, Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 483 days.

(21) Appl. No.: 17/012,089

(22) Filed: Sep. 4, 2020

(65) Prior Publication Data

US 2021/0186117 A1   Jun. 24, 2021

(30) Foreign Application Priority Data

Dec. 18, 2019   (CN) .......................... 201922318649.9

(51) Int. Cl.
| | |
|---|---|
| *A24F 13/00* | (2006.01) |
| *A24F 40/90* | (2020.01) |
| *A24F 40/50* | (2020.01) |
| *A24F 40/40* | (2020.01) |

(52) U.S. Cl.
CPC .............. *A24F 40/90* (2020.01); *A24F 40/40* (2020.01); *A24F 40/50* (2020.01)

(58) Field of Classification Search
CPC ....................................................... A24F 47/00
USPC ................................................. 131/328–329
See application file for complete search history.

(56) References Cited

U.S. PATENT DOCUMENTS

| 2015/0150305 A1* | 6/2015 | Shenkal ................ A24F 40/485 |
| | | 131/329 |
| 2017/0027221 A1* | 2/2017 | Liu ....................... H02J 7/0044 |

* cited by examiner

*Primary Examiner* — Phuong K Dinh
(74) *Attorney, Agent, or Firm* — Matthias Scholl P.C.; Matthias Scholl

(57) ABSTRACT

A rechargeable battery includes a battery cell, a copper threaded ring, a joint, an insulation ring, a first ethylene-vinyl acetate (EVA) ring, a second EVA ring, a battery cartridge, a silicone ring, a pneumatic switch, a support, and a base cover. The copper threaded ring comprises a 510-type threaded interface and a surface provided with a cross-shaped indentation operating as an air inlet of the battery. The insulation ring is disposed in the copper threaded ring. The joint is a hollow structure and is disposed in the insulation ring. The copper threaded ring is disposed on a top end of the battery cartridge.

6 Claims, 3 Drawing Sheets

RECHARGEABLE BATTERY COMPRISING A COPPER THREADED RING WITH A CROSS-SHAPED INDENTATION

CROSS-REFERENCE TO RELATED APPLICATIONS

Pursuant to 35 U.S.C. § 119 and the Paris Convention Treaty, this application claims foreign priority to Chinese Patent Application No. 201922318649.9 filed Dec. 18, 2019, the contents of which, including any intervening amendments thereto, are incorporated herein by reference.

BACKGROUND

The disclosure relates to a rechargeable battery.

The cell capacity of a conventional battery of the electronic cigarettes becomes progressively smaller after the battery is repeatedly recharged. In addition, the screw threads of the battery of conventional electronic cigarettes are specifically corresponding to a type of atomizers. This limits the application range of the battery.

SUMMARY

The disclosure provides a rechargeable battery comprising a battery cell and a copper threaded ring; the copper threaded ring comprises a 510-type threaded interface and a surface provided with a cross-shaped indentation operating as an air inlet of the battery.

The rechargeable battery further comprises a control panel; the output end of the battery cell is connected to the input end of the control panel to supply power to the control panel; and the control panel is provided with a USB interface for charging the battery cell.

The rechargeable battery further comprises a joint, an insulation ring, a first ethylene-vinyl acetate (EVA) ring, a second EVA ring, a battery cartridge, a silicone ring, a pneumatic switch, a support, and a base cover; the insulation ring is disposed in the copper threaded ring; the joint is a hollow structure and is disposed in the insulation ring; the copper threaded ring is disposed on a top end of the battery cartridge.

The pneumatic switch is disposed on the control panel; when an air flow passes through the pneumatic switch, the control panel operates to turn on a power supply; and the silicone ring is disposed on the pneumatic switch to protect the pneumatic switch.

The first EVA ring and the second EVA ring are disposed on two ends of the battery cell, respectively.

The control panel is disposed on the support; and the support is disposed on the base cover.

The base cover comprises a charging port; the charging port communicates with the USB interface of the control panel; the battery cell is disposed in the battery cartridge; and the base cover is disposed on a bottom end of the battery cartridge.

The battery cell can be recharged for more than 1000 times, thus prolonging the service life the battery. The copper threaded ring comprises a 510-type threaded interface which is compatible with various atomizers.

DETAILED DESCRIPTION

To further illustrate; embodiments detailing a rechargeable battery are described below. It should be noted that the following embodiments are intended to describe and not to limit the disclosure.

Figure 1:
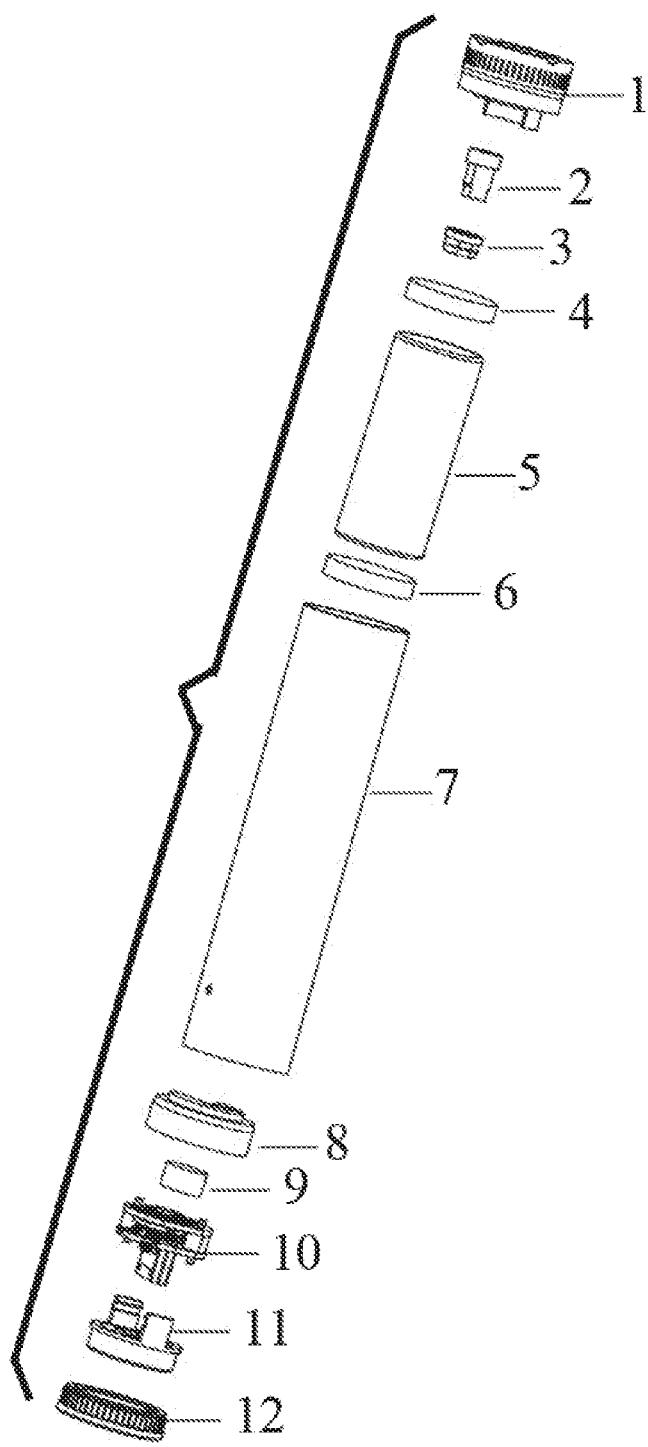
FIG. 1 is an exploded view of a rechargeable battery according to one embodiment of the disclosure.
Figure 2:
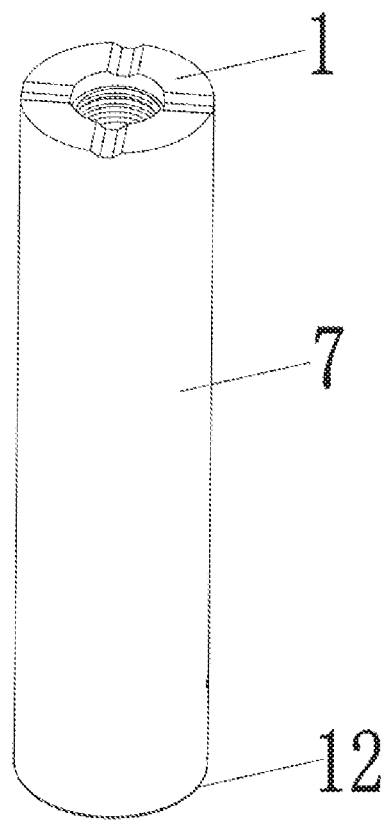
FIG. 2 is a schematic diagram of a rechargeable battery according to one embodiment of the disclosure.
Figure 3:
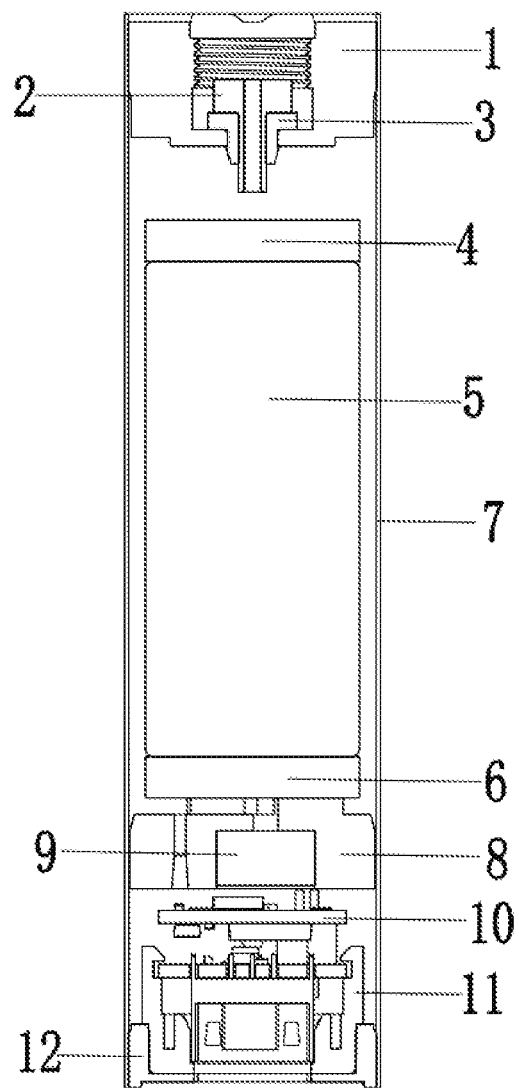
FIG. 3 is a sectional view of a rechargeable battery according to one embodiment of the disclosure.

As shown in FIGS. 1-3, a rechargeable battery comprises a copper threaded ring 1, a joint 2, an insulation ring 3, a first ethylene-vinyl acetate (EVA) ring 4, a battery cell 5, a second EVA ring 6, a battery cartridge 7, a silicone ring 8, a pneumatic switch 9, a control panel 10, a support 11, and a base cover 12. The copper threaded ring 1 comprises a 510-type threaded interface compatible with various atomizers and a surface provided with a cross-shaped indentation operating as an air inlet of the battery.

The insulation ring 3 is disposed in the copper threaded ring 1 for electrode insulation. The joint 2 is a hollow structure and is disposed in the insulation ring 3 as an air passage of the battery. The output end of the battery cell 5 is connected to the input end of the control panel 10 to supply power to the control panel 10. The pneumatic switch 9 is disposed on the control panel 10; when an air flow passes through the pneumatic switch 9, the control panel operates to turn on a power supply; and the silicone ring 8 is disposed on the pneumatic switch 9 to protect the pneumatic switch 9. The first EVA ring 4 and the second EVA ring 6 are disposed on two ends of the battery cell 5, respectively. The control panel 10 is disposed on the support 11 whereby the control panel 10 and the USB interface thereon are fixed on the support H; and the support H is disposed on the base cover 12 whereby the support is fixed on the base cover 12. The base cover 12 comprises a charging port; the charging port communicates with the USB interface of the control panel 10; the battery cell 5 is disposed in the battery cartridge 7; and the base cover 12 is disposed on the bottom end of the battery cartridge 7. The copper threaded ring 1 is disposed on the top end of the battery cartridge 7.

The battery cell can be recharged for more than 1000 times, thus prolonging the service life the battery.

The copper threaded ring comprises a 510-type threaded interface which is compatible with various atomizers.

It will be obvious to those skilled in the art that changes and modifications may be made, and therefore, the aim in the appended claims is to cover all such changes and modifications.

What is claimed is:

1. A rechargeable battery comprising a battery cell, a copper threaded ring, a joint, an insulation ring, a first ethylene-vinyl acetate (EVA) ring, a second EVA ring, a battery cartridge, a silicone ring, a pneumatic switch, a support, and a base cover; wherein:
    the copper threaded ring comprises a 510-type threaded interface, and a surface provided with a cross-shaped indentation operating as an air inlet of the battery;
    the insulation ring is disposed in the copper threaded ring;
    the joint is a hollow structure and is disposed in the insulation ring; and
    the copper threaded ring is disposed on a top end of the battery cartridge.

2. The rechargeable battery of claim 1, further comprising a control panel; wherein an output end of the battery cell is connected to an input end of the control panel to supply power to the control panel; and the control panel is provided with a USB interface for charging the battery cell.

3. The rechargeable battery of claim 2, wherein the pneumatic switch is disposed on the control panel; when an air flow passes through the pneumatic switch, the control panel operates to turn on a power supply; and the silicone ring is disposed on the pneumatic switch to protect the pneumatic switch.

4. The rechargeable battery of claim 1, wherein the first EVA ring and the second EVA ring are disposed on two ends of the battery cell, respectively.

5. The rechargeable battery of claim 2, wherein the control panel is disposed on the support; and the support is disposed on the base cover.

6. The rechargeable battery of claim 1, wherein the base cover comprises a charging port; the charging port communicates with the USB interface of the control panel; the battery cell is disposed in the battery cartridge; and the base cover is disposed on a bottom end of the battery cartridge.

* * * * *